May 27, 1958 A. A. BERNARD 2,836,701
METHOD AND APPARATUS FOR GAS-SHIELDED METAL ARC WELDING
Filed Aug. 28, 1956 3 Sheets-Sheet 1
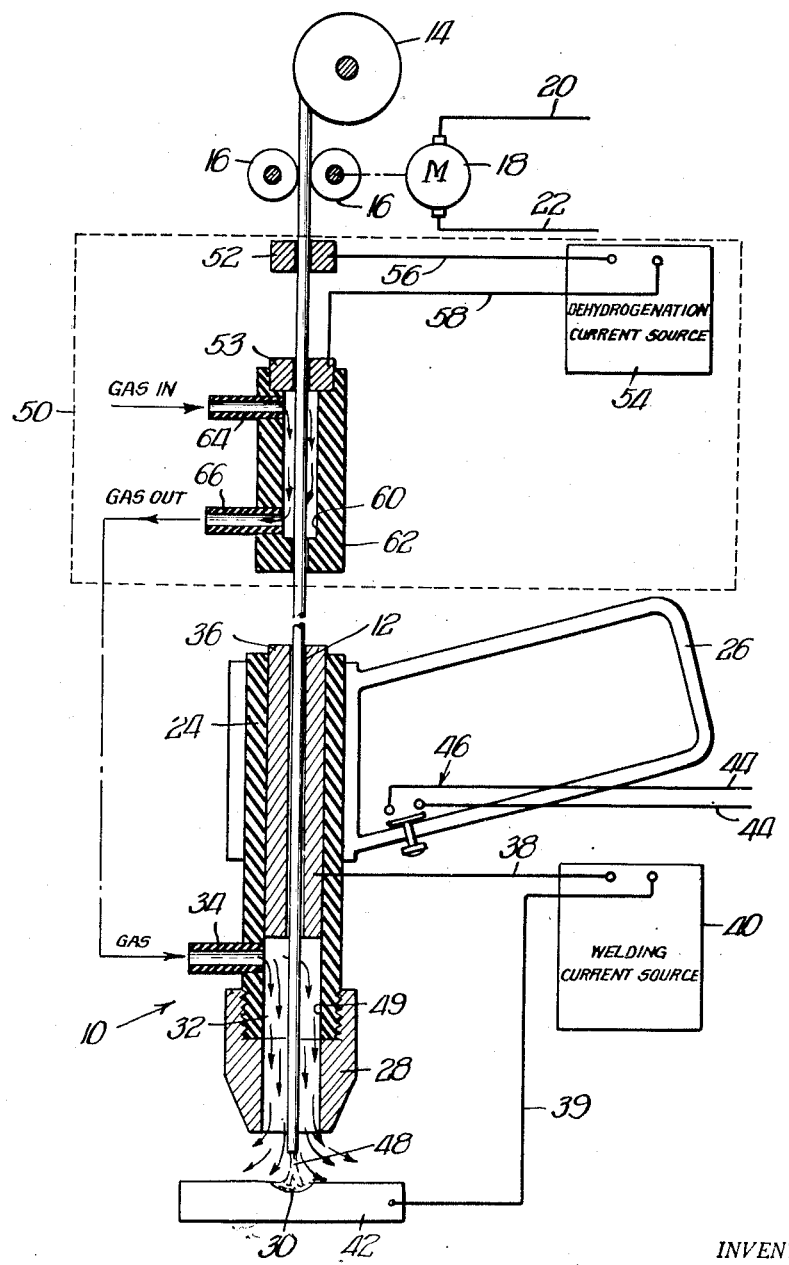
INVENTOR.
Arthur A. Bernard,
BY
Mann, Brown & McWilliams,
Attys.

May 27, 1958  A. A. BERNARD  2,836,701
METHOD AND APPARATUS FOR GAS-SHIELDED METAL ARC WELDING
Filed Aug. 28, 1956  3 Sheets-Sheet 2
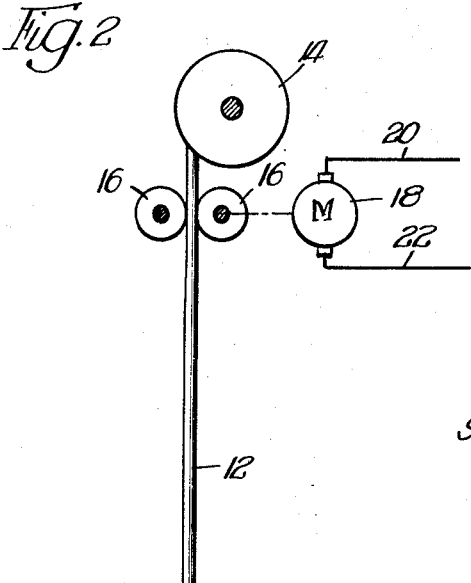
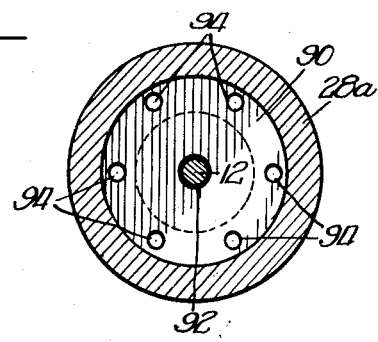
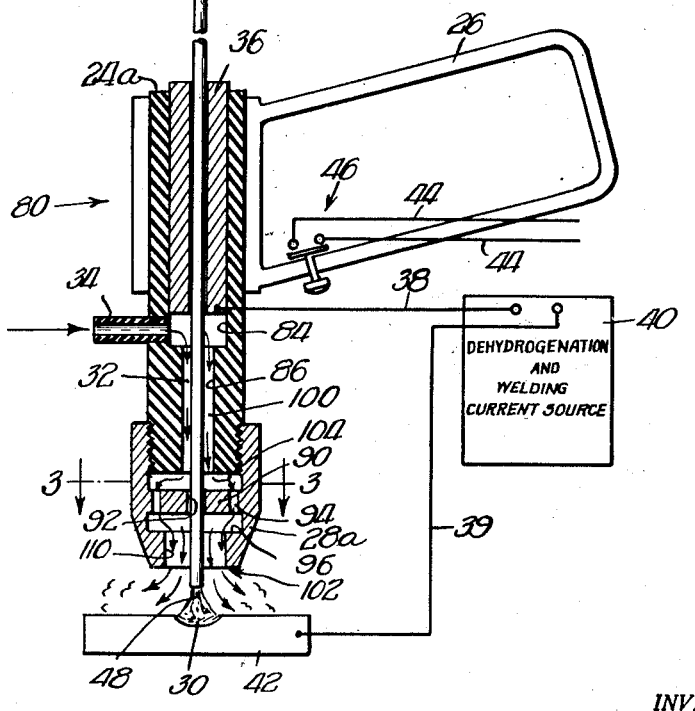
INVENTOR.
Arthur A. Bernard,
BY
Mann, Brown & McWilliams
Attys United States Patent Office 2,836,701
Patented May 27, 1958

2,836,701

METHOD AND APPARATUS FOR GAS-SHIELDED METAL ARC WELDING

Arthur A. Bernard, Chicago Heights, Ill.

Application August 28, 1956, Serial No. 606,746

6 Claims. (Cl. 219—74)

My invention relates to a method and apparatus for gas-shielded metal arc welding, and more particularly, to an arc welding method and apparatus in which a consumable electrode is fed to a gas-shielded arc formed by electric current passing between the tip of the electrode and the workpiece.

There has been a very strong desire throughout all of the welding industry to make wide use of the gas-shielded metal arc process for welding, for instance, common steel. However, heretofore it has not been possible to consistently provide the high quality welds of which this process should be capable. Some heretofore unknown factor has caused unexplained inconsistencies in the welds.

It has long been suspected that hydrogen carried into the arc by the electrode adversely affects the weld metal. See, for instance, "Welding Metallurgy" by Henry and Claussen (American Welding Society), second edition, 1949, pages 295 and 372–386.

I have established that the presence of relatively small amounts of hydrogen in the electrodes employed in the gas-shielded metal arc processes are much more harmful than the substantially greater amounts present in electrodes used by other metal arc processes, because when applied with conventional gas-shielding apparatus, practically all of the hydrogen contained within the electrodes is carried into the arc, and this is not the case with the flux-coated electrode and the submerged-arc processes.

Regarding the flux-coated electrode process, the instant the arc is established, its core wire starts to heat over its total length due to the resistance to the flow of welding current through it. The heating of the electrode, therefore, releases the hydrogen between where electrical contact is made to its gripped end and where the shielding gas is released from its coating of flux at the arc; hence, very little of the total hydrogen contained within the electrode is released at the arc where it can combine with the shielding gas to contaminate the weld metal.

Regarding the submerged-arc process, during welding the bare surface electrode is also in a constant heated state between where welding current contact is made to it and at its tip where it is consumed by the heat of the arc. The resistance heated electrode of the submerged-arc process is completely exposed to the surrounding air between where electrical contact is made to it and the mound of flux which blankets the arc; therefore, the released hydrogen is free to move out into space from this exposed area, and also, the blanket of flux acts as a barrier shielding the arc from the hydrogen released above the flux-shielding blanket.

Regarding the gas-shielded metal arc process, just as in the case of the submerged-arc process, during welding, the electrode is in a constantly heated state between where welding current contact is made to it and its tip where the arc performs; and, hence, hydrogen is released from the electrode between these two points. However, with conventional apparatus, the gas used for shielding the arc flows in an unturbulent annular stream down over the total length of the electrode between these two points; therefore, even though the hydrogen is released above the tip of the electrode as in the case of the flux-coated and submerged-arc welding processes, in gas-shielded welding all of the hydrogen is moved downward to the arc by the annular flow of shielding gas flowing over its surface.

The above referred-to resistance heat which develops in electrodes used by the flux-coated electrode and the submerged-arc processes is nominal as compared to the much higher temperatures reached in electrodes used by the gas-shielded metal arc process. This is due to the much higher welding current densities used by the gas-shielded metal arc processes, which are an average of five times the densities used by the flux-coated electrode processes and two or more times the densities used for submerged-arc welding. Consequently, the resistance heating of electrodes used by the flux-coated electrode and the submerged-arc processes cannot be relied on for dehydrogenating these electrodes.

Hydrogen finds its way into or onto the electrodes used by the gas-shielded metal arc process in a number of ways. It may be absorbed during the manufacture and processing of the steel ingots and billets down to wire electrode sizes, or it may come entirely from moisture that condenses on the surface of the electrodes and is absorbed into the microscopic size fissures on the surface thereof by capillary action. Storing of electrodes in airtight containers is impractical since once the container is opened, if the electrode is not used up in one day, it becomes contaminated. During periods of high humidity, contamination takes a relatively short period of time.

The principal object of this invention is to provide a method and apparatus of gas-shielded metal arc welding in which the hydrogen is driven off of and out of the electrode during the welding operation at a zone mechanically separated from the zone where the arc functions.

A further object of the invention is to provide a method and apparatus for gas-shielded metal arc welding in which the electrode is dehydrogenated before passing into the welding gun or torch.

Another object of the invention is to provide a method and apparatus for gas-shielded metal arc welding in which the electrode is dehydrogenated when passing through the welding gun or torch in a manner which prevents all, or at least substantially all, of the hydrogen from contaminating the weld metal.

Yet another object of the invention is to provide a new welding gun or torch for gas-shielded metal arc welding.

Other objects, uses and advantages will be obvious or become apparent from a consideration of the following description and the drawings wherein like reference numerals are applied to like parts throughout the several views.

In the drawings:

Figure 1 is a diagrammatic view illustrating one form of apparatus arranged in accordance with the principles of my invention;

Figure 2 is a view similar to that of Figure 1 illustrating another embodiment of my invention;

Figure 3 is a cross-sectional view along the line 3—3 of Figure 2; and

Figure 4:
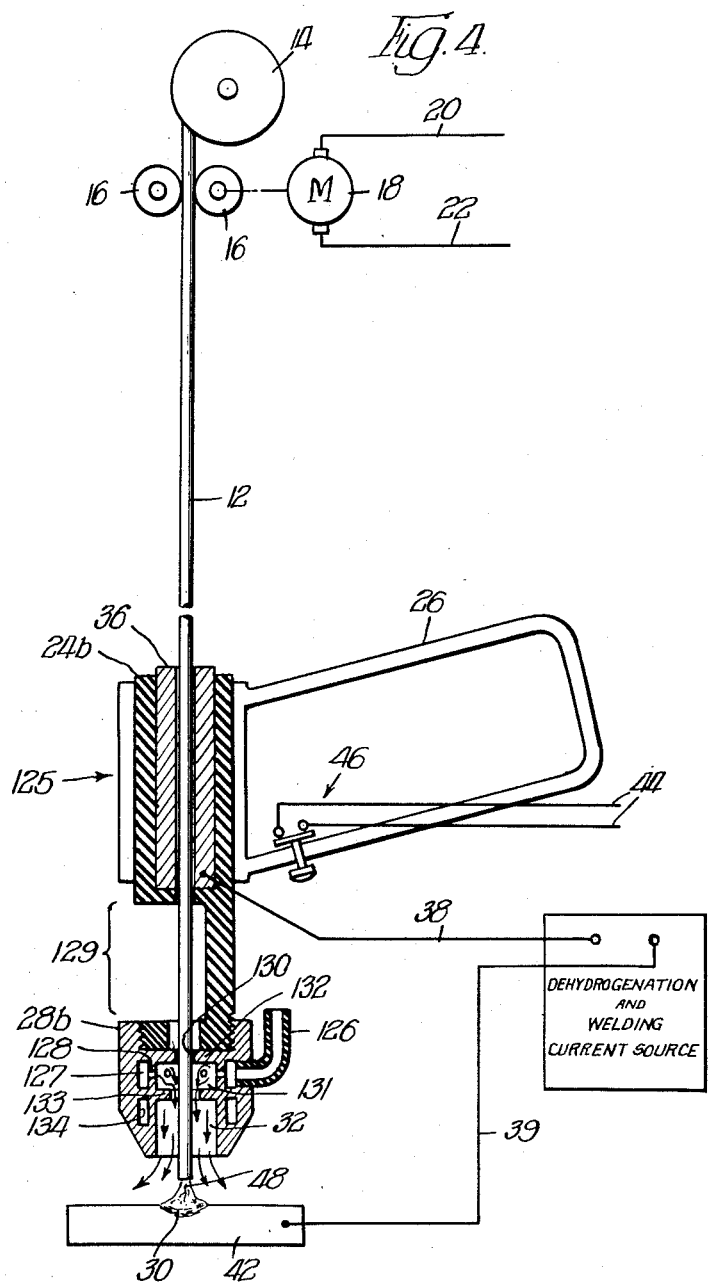
Figure 4 is a view similar to that of Figure 1 illustrating still another form of apparatus arranged in accordance with the principles of my invention.

Referring first to Figure 1 of the drawings, reference numeral 10 generally indicates a conventional welding gun or torch which receives a conventional electrode 12 during the welding operation. The electrode 12 is conventionally withdrawn from a reel 14 by, for instance, a set of feed rollers 16 driven by a suitable motor 18, with the speed of the motor being governed by a suitable control (not shown) which feeds current to the motor 18 through appropriate conductors 20 and 22.

The welding gun or torch 10 generally comprises a welding gun body 24, which in the illustrated embodiment includes a handle 26, said body 24 having a nozzle 28 secured (as by screw threading) to the arc-forming end thereof. The nozzle 28 directs the flow of shielding gas 32 over the arc 48 and the molten weld metal 30, the shielding gas 32 passing into the gun 10 through a nipple 34. The gas 32 may be carbon dioxide, argon or the like supplied from a suitable container therefor through a flexible hose attached to nipple 34, as is well known in the art.

The gun 10 conventionally includes a diagrammatically illustrated contact brush 36 to which the welding current cable 38 leading from the welding current supply 40 is attached. The second welding current cable 39 is attached to the workpiece 42; leads 44 connected to the hand operated switch 46 on the gun handle may be connected in the welding apparatus electric circuit. The circuit is preferably arranged so that when the switch 46 is closed, welding current flows from the current source 40 through conductor 38, brush 36, electrode 12, through arc 48, workpiece 42, through conductor 39, and thence back to source 40. Or, the current may flow in the reverse direction, and in the case where alternating current is used, the direction of flow current would alternate as per the particular frequency. The circuits for the motor 18 and the mechanism for driving roller 16 may also be incorporated in the welding apparatus circuit so that switch 46 operates and controls them, and preferably, the switch 46 also controls, for instance, a solenoid valve (not shown) which, when open, provides the flow of shielding gas 32 into the gun 10 through nipple 34.

As shown, the lower portion of the gun and the nozzle are formed to provide an annular space or passage 49 about the electrode so that the shielding gas is directed in an annular stream over the surface of the electrode and then the arc 48 as the gas passes from the nozzle 28.

In the form of the invention applied to the apparatus of Figure 1, the electrode 12 is dehydrogenated at a point remote from the gun or torch 10, and the structure diagrammatically illustrated within the dotted line 50 illustrates a preferred manner of accomplishing this result.

At an appropriate point after the electrode 12 leaves feed rollers 16, a pair of eelctrical contact brushes 52 and 53 are suitably mounted to receive the electrode 12 and are connected to a dehydrogenation current source 54 by leads 56 and 58. The brushes 52 and 53 are spaced from each other an appropriate distance. The source of current 54 may be a conventional direct current arc welding generator, or an alternating current welding transformer which may or may not be equipped for rectifying the A. C. current. Preferably, the dehydrogenation current source is connected into the welding apparatus circuit so that switch 46 energizes same when the welding operation is started. Current passes from the dehydrogenation current source 54 through, for instance, lead 56, brush 52, the portion of the electrode 12 between brushes 52 and 53, and through lead 58 back to the source 54. In accordance with my invention, the flow of current between brushes 52 and 53 is made sufficient to heat the electrode (by resistance) to the temperature required to carry out the dehydrogenation operation.

The temperature required to dehydrogenate the electrode 12 will be governed by the manner in which hydrogen is associated with the electrode. If, for example, hydrogen is present as an element or component of water, oil, grease, soap, wax, tallow, etc., within the pores of the electrode and on the surface thereof, it can be removed by evaporation at temperatures of 225° F. to 400° F. For removing hydrogen contained in compounds used as fluxes and in adhesives used for anchoring the fluxes to the surface of the electrode, temperatures of as high as 900° F. may be required. Generally speaking, however, the dehydrogenation apparatus and the electrode should be arranged so that electrode may be heated to as high as 1000° F. should this temperature be necessary. It is recommended that the type of electrode used by a particular apparatus be marked by the manufacturer thereof regarding the temperature required for complete dehydrogenation.

With respect to the amount of current required to heat the electrodes to dehydrogenation temperatures, this is also governed by a number of factors. The diameter of the electrode, the analysis of the electrode, the distance between the two brushes 52 and 53 through which the electrode is fed, and the speed at which the electrode is fed to these brushes all have a bearing on the amount of current required to heat the electrode to dehydrogenation temperature.

An important feature of the embodiment of Figure 1 is the provision for cooling the electrode after it has been dehydrogenated. In the form diagrammatically illustrated in Figure 1, the electrode passes through a cooling chamber 60 formed by an appropriate housing 62. As the electrode 12 passes through the chamber 60, it is cooled by passing a monotomic inert gas, such as argon or helium or a diatomic gas, such as carbon dioxide, over the surface thereof. The gas may come from a suitable source connected to nipple 64 which connects it to the interior of chamber 60, and thence the gas passes out of chamber 60 through nipple 66 to the desired point of disposition.

I have found it helpful to connect the nipples 34 and 66 by a suitable conduit, which arrangement provides preheated shielding gas for the welding gun or torch 10, with consequent less chilling of the molten weld metal. This permits the weld metal to remain molten a longer period of time, with the result that more time is provided for gases and nonmetallic impurities to float up to the surface of the weld.

Gases, other than the arc-shielding gases, argon or helium or diatomic carbon dioxide, may be used for cooling the electrode 12, and, in fact, air can be used, provided it does not contain moisture.

It may be added that other ways of cooling the electrode will occur to those skilled in the art; the important thing is that some means is to be provided for cooling the electrode before it reaches the gun when temperatures in the higher ranges are used.

In the apparatus of Figure 2, the dehydrogenation of the electrode is accomplished within the modified welding gun 80. The welding gun 80 includes the handle 26 and a body 24a formed from a suitable shock-resisting, heat-resisting and electric insulating material, such as glass fiber bonded with a thermosetting plastic. The gun 80 includes nipple 34 which feeds the shielding gas 32 into an annular chamber 84 at the base of the brush 36. The body 24a is appropriately formed to define the chamber 84 when the brush 36 is fixed in place somewhat as shown, and also includes a passage 86 of reduced diameter (compared to passage 49 of conventional gun 10) which extends axially of the body 24a. Of course, the electrode 12 passes through the brush 36 and through the axial centers of the chamber 84 and the passage 86, as shown in Figure 2. The nozzle 28a, preferably made of copper, is formed with a partition 90 that is in turn formed with a central perforation or passage 92 and a plurality of outer perforations or passages 94. The perforation 92 is preferably of a size that will closely receive electrode 12, the size thereof being only one or two-thousandths of an inch larger in diameter than the electrode 12. The nozzle 28a includes an annular shoulder 96 that extends inwardly of the perforations or holes 94 with respect to the axis of the electrode 12.

The welding apparatus of Figure 2 may include the reel 14, driving rollers 16, motor 18, and welding current source 40 of Figure 1, as well as switch 46, leads 38, 39 and 44, and current source 40.

In a conventional welding torch or gun, such as gun 10 illustrated in the lower portion of Figure 1, the shielding gas 32 flows in a straight annular uninterrupted stream all the way from the contact brush 36 to the arc 48. In general practice, the thickness of the annular stream of gas flow over the surface of the electrode is governed by the inside diameter of the nozzle 28, and this thickness is varied by selecting a nozzle size to suit the diameter of the electrode and the current density used, and depending on these factors, the thickness of the stream of gas in contact with the surface of the electrode varies from 5/32 of an inch to 3/8 of an inch.

It is generally known that a portion of the shielding gas in conventional apparatus enters the arc 48 and mixes with the stream of metal vapor which forms the arc. What is not so generally known is the following phenomenon, which accounts for how a high portion of the shielding gas enters the arc stream in the conventional gas-shielded metal arc welding processes.

A very strong jet action or force exists at the tip of the electrode where, due to unusually high current densities, as compared to the more common manually applied flux-coated electrode processes, a corresponding much larger portion of the melted metal is converted (expanded) into metal vapor. The force of the metal vapor jet originating at the tip of the electrode creates an annular vacuated area around the tip of the electrode, and it is through this annular vacuated area that the shielding gas is literally sucked into the arc; in fact, when the arc is not shielded with an unharmful gas, it is through this vacuated area that ambient air containing a harmful amount of oxygen is sucked therein. The thickness of this vacuated area is quite narrow and varies with the force of the jet action which in turn is proportional to the welding current density. Naturally, it is difficult to accurately explore this invisible phenomenon, but it is reasoned that with a moderate average current density, the thickness of the vacuated area is not greater than one-fifth the thickness of the shielding gas selected by nozzle size to flow in an annular stream down over the surface of the electrode to enclose the arc, and thus about one-fifth the total gas used for shielding the arc is drawn into the arc stream through said vacuated area. Of course, the portion of the shielding gas sucked into the arc is that which is closest to the electrode.

In the gun or torch 10 illustrated in Figure 1, if sufficiently high current densities are used during the welding operation, the electrode 12 may become completely dehydrogenated; however, as mentioned previously, the liberated hydrogen would merely follow an annular and substantially laminar path about and along electrode 12 closely adjacent the surface thereof, and the rapidness of the welding operation does not provide sufficient time to permit much of the hydrogen to penetrate the annular stream of shielding gas. Thus, the hydrogen would be carried directly down over the surface of the electrode and to the tip of the electrode, where substantially all of it would be sucked into the arc stream together with that portion of the shielding gas with which it became mixed. Therefore, with conventional apparatus, even though the electrode becomes dehydrogenated, substantially all of the removed hydrogen is drawn into the arc.

In the embodiment of the invention illustrated in Figure 2, the flow of shielding gas past the electrode is made considerably more turbulent and the partition 90 completely disperses the hydrogen into the shielding gas. Sufficient amperage is used to insure that the electrode is completely dehydrogenated, and then the freed hydrogen is completely mixed with or dispersed into the flow of shielding gas. The partition 90 creates a turbulence in the fluid flow through the gun 80 which insures that only about one-fifth of the liberated hydrogen is sucked into the vacuated area at the tip of the electrode to contaminate the weld metal; meaning, the harm produced by hydrogen is in turn reduced to one-fifth.

The partition 90 divides the gun 80 into a dehydrogenation zone or chamber 100 and an arc zone 102. When switch 46 is actuated to start the welding operation, shielding gas enters the gun through nipple 34 and passes through the annular chamber 84 and the passage 86 of the body 24a, and thence into the annular dispersion recess or chamber 104 at the end of the body 24a, which is defined by the threaded end of body 24a and the nozzle. The chamber 84, the passage 86 and the recess or chamber 104 comprise the dehydrogenation and mixing zone 100. The chamber 84 acts as sort of a pooling area for the shielding gas, and from this pooling area the gas is forced into the annular space between the internal surface of the body 24a defining passage 86 and the outer surface of electrode 12 in an annular stream which proceeds into the recess 104. The channel size between the electrode 12 and the body 24a is preferably quite small or thin so that the shielding gas moves over the surface of the electrode as a thin film and at a high velocity, so as to better pick up all of the hydrogen as it leaves the surface of the electrode and to obtain more thorough mixing of the hydrogen with the shielding gas in the annular flow. This substantially increases the velocity of the shielding gas passing over the electrode as compared to that of conventional guns, and apparently this changes the fluid flow from laminar to turbulent, with a consequent substantial increase in the mixing of the hydrogen with the shielding gas.

As stated hereinbefore, the internal diameter of the perforation 92 is substantially the same as, or only slightly larger than, the external diameter of the electrode 12. The gas flow thus impinges against the inwardly facing surface of the partition 90 and spreads outwardly toward the outer perforations 94, through which it passes into the arc zone 102. This impinging action of the gas completely breaks up the annular flow emitting from passageway 86 and completely disperses liberated hydrogen throughout the shielding gas flow.

In actual practice, the cross-sectional area of the space between the surface of the electrode 12 and the internal surface of body 24a, that is, the passage 86, should be about one-tenth the cross-sectional area of the space between the surface of the electrode and the inside wall 110 of the nozzle 28a; therefore, the velocity of the gas flowing through the passage 86 is about ten times the velocity of the gas as it flows out of the mouth of the nozzle 28a.

It will also be noted that the nozzle 28a is arranged so that the perforations 94 cannot become plugged by accumulation of metal splash and condensed vapor metal on the inside of the nozzle 28a. The annular shoulder 96 shields the perforations 94.

Several other beneficial results are obtained by the arrangement of Figure 2. It will be noted that the shielding gas is heated before it comes into contact with the arc, with the result that the gas has less of a chilling effect as it flows over the surface of the molten weld metal. Thus, as in the improved arrangement of Figure 1, the molten weld metal remains molten for at least a slightly longer period of time, and this provides more time for gases and non-metallic impurities to float up through the molten metal.

It should also be noted that the partition 90 serves as a guiding member for the electrode. It being positioned quite close to the tip of the nozzle 28a, it insures that the electrode tip is centrally located under the open mouth of the nozzle. Electrodes 12 tend to retain part of their curvature after being drawn from a reel 14, and the guiding function of partition 90 insures that the electrode tip will be accurately located with respect to nozzle 28a.

In the apparatus of Figure 4, the dehydrogenation of the electrode is accomplished at two points within another modified welding gun 125. The welding gun 125 includes the handle 26 and a body 24b formed of a shock-resisting, heat-resisting and electric insulating material, such as a glass fiber resin plastic molded to the required shape. Said body 24b has a nozzle 28b secured (as by screw threading) to the welding end thereof. The nozzle 28b includes a nipple 126 which feeds the shielding gas 32 into an annular chamber 127 from which the gas flows through a series of transversely extending perforations or passages 128 into dehydrogenation chamber 131 of said nozzle 28b, from where it moves down over the surface of the electrode 12 and out of the mouth of the nozzle where it blankets the welding operation.

Provision is made in the gun illustrated in Figure 4 to have a substantial portion 129 of the electrode 12 exposed to the open air between where welding current contact is made to it by brush 36 and that portion directly above the arc where the shielding medium is brought in contact with it to flow in an annular stream over its surface to the arc. This is done by forming body 24b so that portion 129 of the electrode is exposed. Therefore, as is the case previously referred to regarding the flux-coated electrode process, the hydrogen removed from the electrode by the resistance heat created by the flow of the high welding current densities through it is free to move out into space and, hence, cannot mix with the shielding gas to be carried into the welding arc.

The nozzle 28b also includes a partition 132, which in the embodiment of Figure 4 is formed to provide the channel 130 through which the electrode is fed into chamber 131 to become coated with the annular shaped column of shielding gas. The perforation forming the channel 130 is in practice only slightly larger in internal diameter than the electrode; therefore, very little, if any, of the removed hydrogen seeps through this channel to contaminate the shielding gas within the nozzle. Shoulder or flange 133 defining the other end of chamber 131 insures that the shielding gas sweeps all the hydrogen from the electrode.

Primarily, there are two important advantages in directing the shielding gas directly against the surface of the electrode (as is the case as the gas leaves the perforations or passages 128); namely, one, any portion of the removed hydrogen present in the form of a close film adjacent to the surface of the electrode is dispersed by these jets of gas (hence, this portion of the hydrogen becomes thoroughly mixed with all and not just a portion of the gas), and, two, the jets of gas directed against the surface of the electrode cool the electrode down considerably, and this is especially the case when the perforations are sufficiently small so that there is a considerable expansion in the gas as it leaves the perforations to fill the cavity within the nozzle. This is particularly so when carbon dioxide is used as the shielding gas.)

To more clearly show its detail, the nozzle 28b shown in Figure 4 is considerably larger than that used in actual practice. In reality, the nozzle is a comparatively small unit just large enough to render the service intended; namely, to provide an annular stream of gas to blanket a short length of the electrode rearward of its tip, to blanket the arc, and to blanket the small pool of molten weld metal produced by the heat of the arc. Preferably, nozzle 28b is made of copper and to prevent the nozzle from becoming excessively overheated by being in close relationship with the arc, a second annular channel 134 is provided in its core for circulating water through the nozzle. Such water cooling is conventional and, therefore, the tubes which carry the water to and from the nozzle are not shown. The making of the small nozzle is facilitated by forming the nozzle from several annular shaped copper pieces assembled with silver solder.

It may be added that partition 132 acts as an electrode guiding member in a manner similar to partition 90 of Figure 2.

It is obvious, of course, that the invention is not limited to the specific embodiments illustrated. Any of the various suggested electrical circuits can be suitably interconnected or separately arranged, as desired. Moreover, heat required for dehydrogenating the electrodes can be obtained by induction as well as by resistance, or by flame heating, or in other ways that will occur to those skilled in the art. The invention is usable with fully automatic welding heads as well as semi-automatic welding torches and guns. Where separate electrical circuits are used for the respective illustrated dehydrogenation operations and the welding operations, either one of the circuits may be alternating or direct current, or both of them may be either one. Though the invention was developed primarily for welding common steel, the invention is equally valuable for welding other materials. Gases such as argon and helium may be used for shielding the arc as well as carbon dioxide.

I contemplate that composite type electrodes may be dehydrogented in accordance with my invention as well as the plain bare wire electrode illustrated and lightly fluxed surface electrodes.

I also contemplate that the gun 80, or gun 125, may be substituted for the gun 10 in the embodiment of Figure 1 to combine the advantages of the different forms of the invention.

The foregoing description and the drawings are given merely to explain and illustrate my invention, and the invention is not to be limited thereto, except in so far as the appended claims are so limited, since those skilled in the art who have my disclosure before them will be able to make modifications and variations therein without departing from the scope of the invention.

I claim:

1. The method of gas-shielded metal arc welding including the steps of heating the electrode at a zone separated from the arc zone sufficiently to dehydrogenate same and at the same time within said separated zone directing the shielding gas over the surface of the electrode axially thereof in a turbulent flow to disperse the hydrogen into the shielding gas.

2. Gas-shielded metal arc welding apparatus comprising a consumable electrode, a welding torch including electrode guiding contacts through which the electrode is fed to the arc, means within said torch for heating the electrode to at least a dehydrogenation temperature, and means for forcefully dispersing liberated hydrogen away from the electrode before it leaves the last contact which guides it to the arc.

3. Gas-shielded metal arc welding apparatus including a consumable electrode, a welding torch formed to receive said electrode, said torch being formed with a dehydrogenation chamber and said electrode passing through said chamber, means for heating said electrode in said dehydrogenation chamber to at least a dehydrogenation temperature, and means to forcefully disperse liberated hydrogen away from said electrode in said chamber.

4. Gas-shielded metal arc welding apparatus including a consumable electrode, a welding torch, said torch including a nozzle at one end thereof and an electrical contact brush spaced from said nozzle, said electrode extending between said brush and said nozzle, said torch being formed with a shielding gas channel of restricted cross-sectional area concentrically disposed with respect to said electrode, gas deflecting means interposed in said channel adjacent the downstream end of said channel, and means for heating said electrode in said channel to at least a dehydrogenation temperature, whereby the electrode is dehydrogenated in said channel and said deflecting means disperses the freed hydrogen into said shielding gas.

5. The apparatus set forth in claim 4 wherein said deflecting means comprises a partition disposed in said channel, said partition being formed with a central perforation through which the electrode extends and further perforations spaced from said central perforation for directing the gas to said nozzle, and wherein said nozzle overlies said further perforations axially of said electrode.

6. The method of gas-shielded metal arc welding including the steps of establishing an arc from a consumable electrode to a workpiece, using sufficient current to heat the electrode to dehydrogenation temperature, shielding the arc with gas and at the same time dispersing hydrogen from the electrode by directing a turbulent flow of the shielding gas over it, fusing a portion of said workpiece with the heat of said arc, and feeding said electrode toward said workpiece to maintain said arc as metal is transferred across the arc from the electrode to combine with the fused portion of the workpiece.

References Cited in the file of this patent

UNITED STATES PATENTS

| | | |
|---|---|---|
| 1,309,696 | Roberts et al. | July 15, 1919 |
| 1,716,614 | Bergman | June 11, 1929 |
| 2,405,673 | Scherl | Aug. 13, 1946 |
| 2,532,410 | Kennedy | Dec. 5, 1950 |
| 2,532,411 | Kennedy | Dec. 5, 1950 |

FOREIGN PATENTS

| | | |
|---|---|---|
| 821,246 | France | Apr. 17, 1937 |